Figure 1:
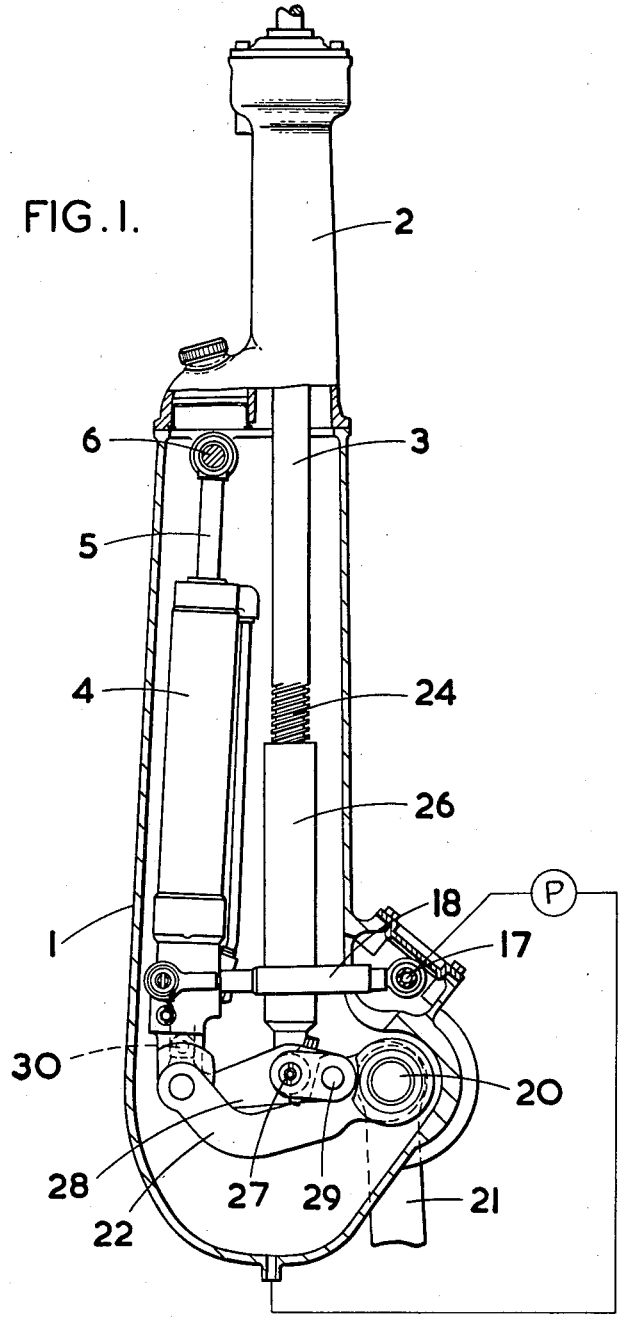

Feb. 26, 1963    F. H. HEACOCK    3,078,828
POWER ASSISTED STEERING GEAR FOR VEHICLES
Filed Sept. 3, 1959    2 Sheets-Sheet 2

INVENTOR
FREDERICK HENRY HEACOCK
Norris & Bateman
ATTORNEYS

United States Patent Office 3,078,828
Patented Feb. 26, 1963

3,078,828
POWER ASSISTED STEERING GEAR
FOR VEHICLES
Frederick H. Heacock, Lincoln, England, assignor to Clayton Dewandre Company Limited, Lincoln, England
Filed Sept. 3, 1959, Ser. No. 837,898
Claims priority, application Great Britain Sept. 9, 1958
9 Claims. (Cl. 121—41)

This invention relates to power-assisted steering gear for vehicles and of the kind comprising a combined steering box and power cylinder/control valve assembly.

Steering gear of the above kind usually embody a power cylinder arranged concentrically of the steering shaft or a cylinder, or a pair of cylinders, mounted in a position offset to the pitman arm shaft, together with gearing or linkage for transmitting the output of the cylinder to said shaft.

Arrangements are also known in which the cylinder of the servo motor is formed integral with the steering box housing the output of the servo piston being transmitted by lever mechanism to the pitman arm shaft.

Such arrangements which have the merit of simplifying installation and reducing external piping have, nevertheless, the disadvantage that they are usually substantially larger than the normal manually operated steering box and the increased transverse bulk may interfere with the control pedal installation.

Another disadvantage of these known arrangements is that they generally necessitate the use of a power cylinder or cylinders of short stroke and large bore which produce large hydraulic forces for a given total power output.

The present invention provides an improved power-assisted steering gear which is not subject to the disadvantages above mentioned in that the steering box and power cylinder/valve assembly encroaches only to a very small extent on the space occupied by the control pedals as compared with conventional manual gears whilst permitting use of a power cylinder having a larger than usual stroke to bore ratio resulting in reduced hydraulic forces with corresponding operational advantages.

The invention also provides an improved steering box and power cylinder/valve assembly which simplifies production with corresponding economy in manufacturing costs and which has other improved constructional and operational features as will be described hereafter.

According to the invention the improved power-assisted steering gear comprises a steering box housing, a pitman arm shaft supported transversely in said housing, a power cylinder/control valve assembly pivotally mounted within said housing, and means in the housing for transmitting the output of the power cylinder to the pitman arm shaft.

Figure 2:
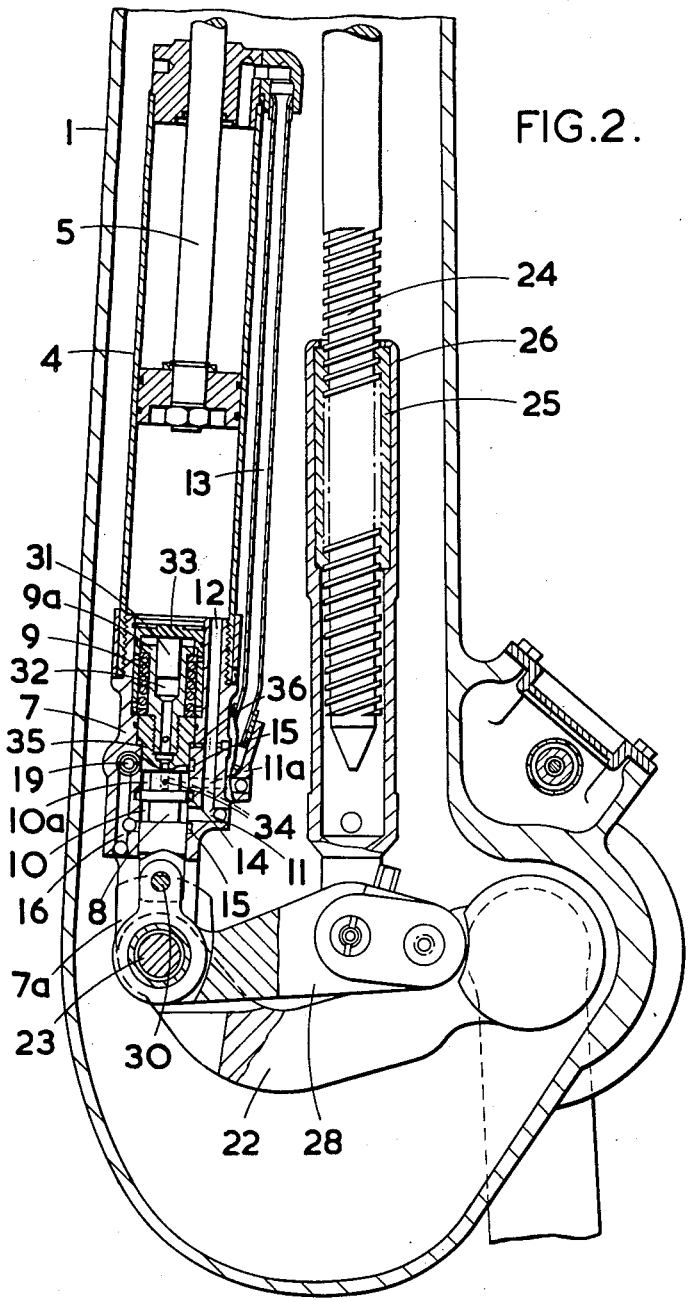

The invention is particularly applicable to steering gear in which the power assistance is provided by a constant flow hydraulic circuit and one such embodiment of the invention will now be described with reference to the accompanying drawings wherein:

FIG. 1 is a side elevation of the gear with the steering box housing in section, and FIG. 2 is a similar view in sectional elevation and to a larger scale.

As shown, the steering box housing 1 is an elongated structure relatively narrow in width but having substantially greater depth from front to rear, the housing being closed at its lower end and its open upper end adjoining the lower end of the steering column casing 2. The steering shaft 3 extends down into the housing 1 and located at the forward side of said shaft in a substantially vertical position is a double-acting power cylinder 4 of substantial length but relatively small diameter, the piston rod 5 of the power cylinder passing through the closed upper end of the cylinder and being pivotally attached at 6 to the housing 1 such that the power cylinder is capable of limited swinging movement in a fore and aft direction. The lower end of the power cylinder is closed by a housing 7 within which is disposed the valve means controlling operation of the power cylinder. It will be seen that said valve means comprises a spool valve 8 fast with a conventional spring abutment centering device 9 normally urging the valve to a neutral or "open flow" position. The lands of the spool valve define two axially spaced peripheral grooves 10, 10a, communicating respectively with two ports 11, 11a, in the housing 7, port 11 leading by way of a passage 12 to the lower end of the power cylinder and port 11a being connected by conduit 13 to the upper end of said cylinder. The bore of housing 7 includes a peripheral groove 14, communicating with an exhaust port (not shown) opening directly to the interior of the main housing 1, and with two similar grooves 15 connected to a common fluid supply passage 16, the arrangement being such that displacement of the valve in one direction or the other will connect one end of the power cylinder to the pressure supply and the other end to exhaust. The housing 1 is charged with fluid and constitutes the reservoir of the hydraulic system, the remainder of the said system consisting of an external pump $p$, a connection from the reservoir to the inlet side of the pump $p$ and a connection from the discharge side of the pump $p$ to a fitting 17 on the wall of the housing 1 from the inner side of which a flexible conduit 18 leads the pumped fluid to the inlet port 19 and passage 16 of the control valve. The said fitting in one form consists of a sleeve extending with sealing fit through the housing wall a banjo fitting disposed adjacent the inner end of the sleeve and to which is attached the flexible conduit connection to the control valve, and a pressure relief valve which retains the banjo fitting on said sleeve and which when open discharges the pressure fluid directly into the reservoir.

The pitman arm shaft 20 extends transversely across the housing near the lower end thereof and at a point rearward of the axis of the steering shaft 3, the pitman arm shaft carrying the pitman arm 21 externally of the housing whilst internally of the housing said shaft carries a forwardly extending lever arm 22 which is pivotally connected at its opposite bifurcated end by a pin 23 to extension lugs 7a on the lower end of the housing 7.

Shaft 3 is threaded to provide a worm 24 which engages a nut 25 formed integral with or secured fast within a sleeve 26, said sleeve being pivotally connected at 27 to a valve-actuating lever 28 at a point intermediate the ends thereof. The lever 28 is pivoted at one end at 29 on lever arm 22 and at its other end is connected at 30 to the spool valve 8, this end of lever 28 being apertured to encircle pivot pin 23 with a clearance so that lever 28 is permitted a limited degree of pivotal movement relative to lever arm 22.

The mechanism provides a reaction at the steering wheel opposing the manual input and proportional to the power applied and for this purpose a reactive force is exerted on the spool valve in one direction by the provision of a plunger 31 housed in a chamber 32 formed in the valve centering spring retainer 9a and bearing at one end against a wall 33 closing the upper end of valve housing 7, pressure being transmitted to the chamber at the opposite end of the plunger through axial and cross drillings 34 in the spool valve adapted to communicate with a passage which is pressurised when steering movement is being effected in that particular direction. Reaction in the opposite direction is provided by transmitting pressure to an enlarged diameter or face 35 of the spool valve through a drilling 36 communicating with passage 12 through the lever 28 and the "reversible" worm assembly to the steering shaft 3 to give "feel" at the steering wheel rim.

The mechanism described operates as follows:

The manual effort on the steering wheel produces through the worm and nut gear an axial displacement of the sleeve 26 which in turn rocks the valve-actuating lever 28 about its pivot so causing the valve to admit pressure fluid to one end or the other of the power cylinder, said cylinder being thereby displaced upwardly or downwardly and, through the lever arm 22, pitman arm shaft 20 and pitman arm 21, transmits the desired movement to the steering linkage. When turning movement of the steering wheel ceases, the follow up movement of the power cylinder and valve housing will restore the valve to the lapped condition and hold the road wheels on the set lock, whilst release of holding pressure on the steering wheel permits the valve to move to the neutral position under the action of the centering means 9 and also permits the steerable road wheels to rotate towards the straight ahead position under the influence of the castor action or self-righting characteristics built into the steering linkage. In the event of a failure of the hydraulic system, movement of the steering wheel through the worm assembly rocks the valve actuating lever 28 until the clearance between the apertured end of this lever and the pin 23 has been taken up and thereafter the thrust or pull of the sleeve 26 is transmitted directly through lever 28 and lever arm 22 to the pitman arm shaft 20. It will be understood that the worm assembly may be substituted by a gear of the recirculating ball or other type which will produce axial movement of the sleeve or an equivalent member.

It will be noted that the valve actuating lever 28 gives a multiplication of the movement imparted to sleeve 26 by rotation of the steering wheel. Since valve actuation demands an "idle" movement of the steering wheel, it is obviously advantageous to use a multiplying mechanism to keep such lost movement to an acceptable minimum without the need to produce the valve parts to extremely close longitudinal tolerances which may tend to be uneconomical. Alternatively, or additionally, the permissible increase in valve spool travel can be utilised to introduce land relief to adjust pressure control characteristics of the valve, and by appropriate design of the valve actuating lever any desired multiplication of movement can be obtained to meet particular operational requirements.

By the improved construction it is possible to compensate for the differential piston area of the double-acting power unit by arranging the power cylinder at an angular relationship to the lever arm 22 that will give equivalent torques at the two extremes of travel for the same fluid pressure, the reaction areas being adjusted in accordance with the resolved components of the reaction forces required, to give a close approximation to theoretical requirements.

The arrangement also effects compensation in the rate of angular movement of the pitman arm towards the extremes of lock when working at a controlled rate of fluid flow. The pressure/output torque compensation provided to reach the locks has a contrary effect on return from the full lock position but this is not significant, since return to the straight ahead position does not normally require power assistance.

Other advantages of the improved construction include:

(1) The combined unit can be bench assembled and tested conveniently before installation.

(2) Enclosure of the combined power cylinder and valve unit in the housing or reservoir provides full protection against atmospheric deterioration and obviates possibility of troubles due to ingress of dirt and water thrown up from the roads. Special gaitering and protection can be eliminated and simple sealing arrangements can be used, since a slight leakage is not significant, such fluid finding its way back to the reservoir without loss.

(3) The whole unit forms a simple and efficient mechanism that can be serviced confidently by any component mechanic.

(4) The arrangement permits the adoption of a geometry which gives the maximum practicable output for a double acting cylinder of any size when working to a specified maximum pressure in any such application where equal torque is required towards the limit of either direction of travel.

I claim:

1. A power assisted steering gear for a vehicle comprising a relatively stationary steering box housing, a rockable pitman arm shaft extending transversely within the lower end of said housing, a power cylinder and control valve assembly extending downwardly within said housing, means pivotally mounting the upper end of said assembly within said housing, a rotatable steering shaft extending downwardly through said housing alongside said assembly, and mechanism within said housing and operatively connecting said pitman arm shaft to the lower ends of said steering shaft and said assembly whereby when said steering shaft is rotated said assembly is automatically actuated to rock said pitman arm shaft.

2. A power assisted steering gear comprising a housing, a transverse pitman arm shaft rockably mounted within said housing, a power cylinder and control valve assembly pivotally mounted at its upper end within said housing, a rotatable steering shaft extending downwardly in said housing alongside said assembly, a lever arm rigid with said pitman arm shaft and operatively connected to said assembly to be rocked thereby, a valve actuating lever pivoted on said lever arm and operatively connected to said assembly, said valve actuating lever being rockable about its pivot connection to said lever arm to actuate the control valve of said power cylinder and control valve assembly, and mechanism connecting the steering shaft to said valve actuating lever within the housing for converting rotation of said steering shaft to rocking of said valve actuating lever.

3. A power assisted steering gear comprising a housing, a transverse pitman arm shaft rockably mounted within said housing, an arm within the housing rigid with said shaft, a valved motor assembly mounted within the housing and comprising a power cylinder having an element displaceable in opposite directions in response to fluid pressure and a valve unit connected to select application of fluid pressure to said cylinder to move said element in a selected direction, means operatively connecting said arm to said element for moving said arm in response to displacement of said element, a valve actuating lever pivoted on said arm and operatively connected to said valve unit for actuating said valve unit, and a rotatable steering shaft extending through said housing into operative connection with said valve actuating lever for pivoting said valve actuating lever to actuate said valve unit upon rotation of said steering shaft.

4. In the power assisted steering gear defined in claim 3, said valve unit comprising a slidable spool valve in the lower end of said motor assembly operatively connected to said valve actuating lever.

5. In the power assisted steering gear defined in claim 4, spring means urging said spool valve to a neutral position in absence of fluid pressure acting on said element, and means effective when said steering shaft is actuated to move said spool valve in either direction for applying fluid pressure to oppose said movement of said spool valve in a selected direction.

6. In the power assisted steering gear recited in claim 3, said motor assembly being pivoted at its upper end within the housing, said pitman arm shaft being in the lower part of said housing, and said motor assembly and steering shaft extending downwardly alongside each other within said housing.

7. In the power assisted steering gear defined in claim 3, means providing a lost motion connection between said valve actuating lever and said arm so that in the event of power failure at said motor assembly turning effort on said steering shaft will be positively applied to said arm after predetermined relative movement between said lever and arm.

8. The power assisted steering gear defined in claim 3 comprising a hydraulic circuit adapted to furnish pressurized fluid to said motor assembly to power said motor assembly with said housing being disposed in said circuit and providing a reservoir for the hydraulic fluid in said circuit.

9. The power assisted steering gear defined in claim 3 wherein said valve unit comprises a valve actuator displaceable to govern the operation of said motor assembly, and means pivotally connecting said valve actuator to said valve actuating lever separate from the pivot connection of said valve actuating lever to said arm.

References Cited in the file of this patent

UNITED STATES PATENTS

| | | |
|---|---|---|
| 1,154,396 | Hayot | Sept. 21, 1915 |
| 2,048,978 | Tait | July 28, 1936 |
| 2,053,301 | Russell | Sept. 8, 1936 |
| 2,063,937 | Kundig | Dec. 15, 1936 |
| 2,204,649 | Barnhart | June 18, 1940 |
| 2,566,273 | Westbury | Aug. 28, 1951 |